(12) United States Patent
Krause et al.

(10) Patent No.: US 7,644,825 B2
(45) Date of Patent: Jan. 12, 2010

(54) MEMBRANE AND USE THEREOF

(75) Inventors: Bernd Krause, Rangendingen (DE);
Matthias Wessling, Enschede (NL);
Hermann Göhl, Bisingen (DE);
Markus Storr, Filderstadt (DE)

(73) Assignee: Gambro Lundia AB (SE)

( * ) Notice: Subject to any disclaimer, the term of this patent is extended or adjusted under 35 U.S.C. 154(b) by 239 days.

(21) Appl. No.: 10/532,131

(22) PCT Filed: Oct. 17, 2003

(86) PCT No.: PCT/EP03/50730

§ 371 (c)(1),
(2), (4) Date: Dec. 22, 2005

(87) PCT Pub. No.: WO2004/050222

PCT Pub. Date: Jun. 17, 2004

(65) Prior Publication Data

US 2006/0138044 A1    Jun. 29, 2006

(30) Foreign Application Priority Data

Nov. 30, 2002   (EP)   .................................. 02026720

(51) Int. Cl.
*B01D 71/06* (2006.01)
*B01D 71/68* (2006.01)
*B01D 71/28* (2006.01)
*B01D 71/00* (2006.01)

(52) U.S. Cl. ........................... 210/500.22; 210/500.41; 210/500.42; 264/41

(58) Field of Classification Search ........................ None
See application file for complete search history.

(56) References Cited

U.S. PATENT DOCUMENTS

| 5,178,765 | A | | 1/1993 | Hu et al. |
| 6,620,356 | B1 | * | 9/2003 | Wong et al. .................... 264/41 |
| 2001/0021764 | A1 | | 9/2001 | Weisse et al. |

FOREIGN PATENT DOCUMENTS

| DE | 199 07 824 A | 8/2000 |
| DE | 100 33 401 A | 1/2002 |
| EP | 1 080 777 A1 | 3/2001 |

OTHER PUBLICATIONS

Yoshida, "Production of Polyether Sulfone Resin Foam", Patent Abstracts of Japan of JP 07-138401, (May 30, 1995).
Sakurai, "Hydrophilic Selective Transmitting Membrane", Patent Abstracts of Japan of JP 2000-042383, (Feb. 15, 2000).
Sakurai, "Micro-Porous Membrane of Polyethersulfone and Sulfonated Polyethersulfone Having Endotoxin-Absorptive Power," Patent Abstracts of Japan of JP 07-116484, (May 9, 1995).
Inoue, "Production of Porous Object", Patent Abstracts of Japan of JP 01-247435, (Oct. 3, 1989).
Krause et al., "Bicontinuous Nanoporous Morphologies by Carbon Dioxide Foaming", Macromolecules 2001, 34, pp. 8792-8801.
Mulder, "Basic Principles of Membrane Technology," reprinted in 1997, Kluwer Academic Publishers, Netherlands, pp. 75-77.

* cited by examiner

*Primary Examiner*—Krishnan S Menon
(74) *Attorney, Agent, or Firm*—Finnegan, Henderson, Farabow, Garrett & Dunner L.L.P.

(57) ABSTRACT

The membrane producible by shaping a polymer blend or a block copolymer comprising blocks of monomer units, loading the polymer blend or block copolymer with a blowing gas concentration within the polymer blend or block polymer above a critical concentration at a temperature below a critical temperature, but above the glass transition temperature of the polymer blend/gas or block copolymer/gas mixture and finally stabilizing the foam structure is characterized in that as polymer blend a homogeneous polymer blend comprising at least one hydrophilic and at least one hydrophobic polymer and/or a block copolymer of alternating blocks of hydrophilic and hydrophobic monomer units is used, both the polymer blend and the block copolymer having a solubility relating to the used foaming gas above the critical concentration. The said membrane is used for medical purposes, especially for the haemodialysis, haemofiltration, haemodiafiltration, plasmapherese, immunotherapy, micro- or ultrafiltration or gas separation.

18 Claims, No Drawings

MEMBRANE AND USE THEREOF

The invention is directed to membranes which may be used for the separation of gases, micro or ultra filtrations and especially for medical purposes, like for hemodialysis, hemofiltration, hemodiafiltration, plasmapherese or immuno therapy.

The DE-A-19 520 188 discloses a method for the production of hollow polymer fibre membranes by passing a molten polymer through an extrusion apparatus for forming the hollow fibre membranes, the polymer being loaded with gas under pressure before entering the extrusion apparatus, and at the exit of the polymer from the extrusion apparatus due to a decrease of pressure and thus, expansion of the gases within the polymer a porous hollow fibre membrane being formed. The obtained number of open pores and pore sizes are not satisfactory with respect to micro- and ultrafiltration. The size of pores determines the separation efficiency and the percentage of open pores the membrane efficiency.

The WO 91/08 243 describes a method for the production of polyurethane foams having open cells by mixing a diisocyanate, a hydrogen donor, at least one surfactant, at least one catalyst and a blowing agent which is suitably carbon dioxide. At subatmospheric pressures within a mixing zone keeps the blowing agent in a liquid condition at ambient temperature. Expelling the mixture into the surrounding of room temperature results in fast evaporation of the blowing agent and hardening of the resulting foam at room temperature. This method has the same disadvantages as the above mentioned method.

The DE-A-10 033 401 discloses a membrane prepared by shaping a polymer or polymer mixture, loading before or after shaping the polymer or polymer mixture with a gas at superatmospheric pressure, then foaming the gas loaded polymer or polymer mixture at a temperature above the glass transition temperature of the polymer/gas mixture and finally stabilizing the foam structure, in which method the gas loaded polymer or polymer mixture is foamed at a gas concentration with the polymer or polymer mixture above a critical concentration and at a temperature below a critical temperature.

Starting from this known method the object of the present invention was to improve the biocompatibility of the membrane surfaces which is important for extracorporal systems which contact blood, and to improve the wettability of the membrane and the transport therein. A further object was to provide membranes having satisfactory number and sizes of open pores.

This problem is solved according to the present invention by a membrane producible by shaping a polymer blend or block copolymer comprising monomer blocks, loading before or after shaping the polymer blend or block copolymer with a blowing gas at a superatmospheric pressure, then the blowing gas loaded polymer blend or block copolymer being foamed at a gas concentration within the polymer blend or block copolymer above a critical concentration and at a temperature below a critical temperature, but above the glass transition temperature and finally stabilizing the foam structure. According to the invention this method is characterized by using as the polymer blend a homogeneous polymer blend consisting of at least one hydrophilic and at least one hydrophobic polymer and/or a block copolymer of alternating hydrophilic and hydrophobic blocks of monomer units, both the polymer blend and the block copolymer having a solubility relating to the used blowing gas above the critical concentration.

By membranes produced according to a method of the invention the biocompatibility of the surface of the membranes can be controlled, the adsorption of proteins can be regulated and the wettability of the membrane and transport there through are improved.

The membranes obtained according to the invention have a uniform, permeating nanoporous morphology and thus, a high membrane and separation efficiency. The evaluation of the permeation properties and thus, the open porosity can be carried out as follows.

a) Detailed investigation of scanning electron micrographs

To study the cross section of a foamed polymer the sample is freeze fractured in liquid nitrogen and sputter-coated with gold at standard conditions. Subsequently, the sample is studied using a standard scanning electron microscope (SEM), i. e. JEOL TM220A. Openings for apertures in the foam morphology on the SEM micrographs indicate bicontinuous morphologies.

b) Performing flux measurements

The permeation properties of the foamed films were determined using self-made membrane modules. Experimentally, a piece of 25 mm in length and 7 mm in width is cut out of a foamed sample. The average thickness is calculated out of five measurements along the sample. One side of a polyamide tube is filled with 5 mm play-dough in which a slit opening is shaped. The prepared sample piece is fixed in the play-dough in such a way that approximately 5 mm of the sample sticks outside. The tube is filled with approximately 15 mm polyurethane potting material (two component polyurethane glue, 643 B and 725 A, Morton Adhesives and Specialty Chemicals) from the top after proper embedding of the sample with play-dough. After a drying period of 24 h the membrane module is fixed in a Legris® express coupling, which is connected to a gas piping system. Before starting a measurement, the gas lines are flushed with the gas used (nitrogen or helium) several times. The complete holder (membrane module and express coupling) is submerged in a water bath and the flowing gas is collected in a water filled measuring cylinder. The measurements are performed with a feed pressure of 0.3 MPa. The measurement is stopped after collecting approximately 2-5 ml gas. The normalized flux (P/L) is expressed in $m^3/(m^2 \, h \, bar)$.

c) Measuring the Capillary Elevation

With this, a sample is fixed into an appropriate measuring installation, wherein the ends of the polymer sample are respectively broken in liquid nitrogen. One end of the fixed sample is immersed approximately 2 to 3 mm in a liquid. After an appropriate time the elevation of the liquid level in the membrane is measured. Using changes in weight as well as elevation, the open porosity can be characterized. Closed pore samples do not absorb liquid, and an elevation can not be measured.

For manufacturing the open pore membrane according to the invention, there are four types of method to be considered that are known per se.

The first type of method is the pressure cell method, in which the polymer blend is firstly shaped as required and then, at increased pressure and at a temperature below the glass transition temperature of the polymer/gas mixture, is charged with a gas (blowing agent). Subsequently, the pressurized gas is quickly released from the pressure vessel (within 1 s). After removing the gas-saturated polymer film from the pressure vessel, the sample is immersed in a heating bath maintained at the desired temperature (foaming temperature) during a fixed time (foaming time). If the temperature of the foaming bath is above the glass transition temperature of the polymer/gas mixture foaming of the polymer sample occurs and a open-nanoporous (bicontinuous) morphology can be obtained. The transfer of the sample from the pressure cell into the heating bath has to be performed quickly to reduce diffusional loss of blowing agent out of the material.

The second type of method is the so-called autoclave method, in which the saturation of the polymer or polymer blend with the gas takes place at a temperature above the glass transition temperature of the polymer/gas mixture, and foaming is initiated by a spontaneous decrease in pressure. In contrast pressure cell method, in which the gas-saturated polymer is normally put into a hot bath in order to obtain a temperature which is above the glass transition temperature, with the autoclave method, such heating is unnecessary, as the polymer is already at the necessary temperature above the glass transition temperature when saturated with gas.

The third method is the so-called extrusion method, in which a molten mass of polymer or polymer blend is saturated with the gas in a shaping tool. On leaving the extrusion tool, and the drop in pressure caused by this, foaming occurs.

The fourth technique is the "solid spinning technique" (B. Krause, M. Kloth, N. F. A. van der Vegt, M. Wessling, Porous Monofilaments by Continuous Solid State Foaming, Ind. Eng. Chem. Res. 2002, 41 [5], pages 1195 to 1204), which allows for (i) (semi)continuous saturation of a polymeric shaped material with a physical blowing agent in a pressure cell, (ii) continuous withdrawal of the saturated material from the pressure cell through a specially designed die, and (iii) continuous foaming of the material in a heated medium.

The pressure cell method is currently preferred.

The gas concentration of the hydrophilic polymer blend as well as the temperature during foaming are of major importance to create an open-nanoporous morphology. Dependent on the polymer system the foaming time can effect the foam morphology.

The time for saturation within the pressure cell depends on the polymers used or block copolymer and the critical concentration. The time of transfer from the pressure cell to the heating bath has to be as short as possible and has to ensure that during foaming within the heating bath the gas concentration with the polymer blend or block copolymer is above the critical concentration. By varying the foaming time within the heating bath the permeation can be changed. But for a reproducible production it is suitable to keep constant the time of transfer and foaming and the time of saturation within the pressure cell for special polymer blend or block copolymer by special conditions of the used apparatus.

The membranes according to the invention may be flat membranes, hollow fibre membranes or monofilament membranes. The hydrophobic polymers of the polymer blends may be polysulfones, polyethersulfones, polyetherimides, polycarbonates, polyimides, polyetheretherketones. Preferably, they are polysulfones, polyethersulfones, polyetherimides and/or polycarbonates. The block copolymers may contain as a hydrophobic polymer blocks monomer units of those polymers which have been mentioned as the hydrophobic polymers of the polymer blends according to the invention.

The hydrophilic polymers of the polymer blends may be polyvinylpyrrolidone, sulfonated polyethersulfones, carboxylated polysulfones, caboxylated polyethersulfones, polyethyloxazolines, poly(ethyleneoxide), poly(ethyleneglycol), polyacrylamides, poly(hydroxyethylmethacrylate), polyvinylalcohols, poly(propyleneoxides), polycarboxylic acids, poly(acrylic acids), poly(methacrylic adds) or poly (acrylic nitrile). Preferably, the hydrophilic polymers are polyvinylpyrrolidone, sulfonated polyethersulfones and/or polyethyloxazolines. Within the block copolymers used according to the invention the hydrophilic polymer blocks are composed of monomer units according to the hydrophilic polymers mentioned above as hydrophilic polymers of the polymer blends according to the invention.

The polymer blends used according to the invention have to be homogeneous, i. e. they have to form a single phase. The existence of a single phase of the polymer blends can be determined by measuring the glass transition temperature. If a polymer blend has two glass transition temperatures, the blend is not homogeneous, but heterogeneous. Homogeneous blends have one single glass transition temperature between the glass transition temperatures of the pure polymers of the blend.

The block copolymers to be used according to the invention instead of the polymer blends have inherently a single glass transition temperature.

The polymer blends and block copolymers used according to the invention have to have a solubility for the used blowing gas above the critical concentration. Such a concentration of saturation above the critical concentration can easily be obtained by selection and control of the necessary saturation conditions (temperature of saturation and pressure of saturation). The critical concentration which has to exist during foaming, i. e. within the heating bath in the event of the pressure cell method, is suitably at least 40, preferably at least 43, especially at least 45, or especially at least 47 $cm^3$ (STP)/$cm^3$ of the polymer blend or block copolymer. "STP" means at standard temperature and pressure. These standard conditions are 0° C. and 0,103 MPa.

The invention is not restricted to a special blowing gas, but $CO_2$ is preferred. Instead of $CO_2$ other physical foaming gases may be used, such as chlorodifluoromethane. Also for this blowing gas the critical concentration is in the same order as for $CO_2$. The blowing gas may also be a gas mixture.

Foaming is carried out suitably at a temperature of at least 10° C. below the critical temperature. For each special combination of the polymer blend or block copolymer and blowing gas after determination of the glass transition temperature of this blend or copolymer and of the critical temperature thereof a foaming diagram may be prepared which contains an area above the critical gas concentration within the area between the glass transition temperature and the critical temperature. Within this area the morphology is open, nanoporous (B. Krause, H. J. P. Sij-besma, P. Munukluc, N. F. A. van der Vegt and M. Wessling: Bicontinuous Nanoporous Morphologies by Carbon Dioxide Foaming. Macromolecules 2001, 34, pages 8792 to 8801). Relating to the conditions of loading the blowing gas into the polymer blend or block copolymer and relating to the foaming conditions as well as determination of the solubility of the blowing gas, the glass transition temperature ($T_g$) of the polymer blend/gas mixture or block gas mixture copolymer, the critical temperature of the polymer blend or block gas mixtures copolymer and the critical gas concentration reference is being made to U.S. Pat. No. 7,306,754, the contents of which are herein incorporated by reference.

The solubility of the blowing gas within polymers and polymer blends to find out which polymers and polymer blends can be used suitably for the production of membranes according to the invention is now disclosed:

Determination of the Gas Solubility

To determine the gas solubility of a special blowing gas in polymers and polymer blends an apparatus is used which is comparable with that one which has been developed by Koros and Paul (W. J. Koros, D. R. Paul: Design Considerations for Measurement of Gas Sorption in Polymers by Pressure Decay, J. Polym. Sci, 1976, page 14, 1903 to 1907).

The sorption isotherms are determined for carbon dioxide at 25° C. up to a pressure of 5 MPa. For other gases (for example chloro difluoro methane) much lower pressures (for example 0,8 MPa) are sufficient. The statement of the concentration of dissolved carbon dioxide is made in cubic centimeters $CO_2$ at 0° C. and 0,1013 MPa (standard temperature and pressure [STP]) per cubic centimeter of polymer. It Is also possible to use other volumetric and gravimetric methods to determine the gas solubility in polymers and polymer blends. The sorption isotherms may also be determined for other temperatures and pressures if these parameters are interesting for the foaming method.

The homogeneous blends may be checked in the event of amorphous materials by measuring the glass transition temperature by means of differential scanning caloriemetry (DSC). If the polymer blend consisting of two or more polymers shows one glass transition temperature ($T_g$), then it is a homogeneous blend. Usually the value of $T_g$ of the blend is between the $T_g$ values of the single materials which have been used for the production of the blend. The glass transition temperature ($T_g$) and the critical temperature of the polymer/gas mixture as well as the critical gas concentration are determined as follows.

Determination of the Glass Transition Temperature ($T_g$) of the Polymer/Gas Mixture Samples of the produced polymer films (polymers, polymer blends or block copolymers) are loaded with the gas or gas mixture in a pressure cell. The saturation temperature is 25° C. Preferably the polymer films are saturated with the gas or gas mixture at the temperature where also the sorption isotherm has been determined. This allows the simple conversion of the adjusted gas pressures balance pressures) into concentrations. The gas pressure at which the saturation with a gas (for example carbon dioxide) is carried out is called saturation pressure. By the variation of the saturation pressure and the saturation temperature the corresponding saturation concentration may be changed.

The time for saturation has to be chosen so that a homogeneous concentration profile is obtained. In the event of carbon dioxide as blowing gas and films having a thickness of about 100 µm a saturation time of about 2 h is sufficient. In the event of chloro difluoro methane at identical test conditions a saturation of about 7 days is necessary.

After the spontaneous removal of the blowing gas from the pressure cell the polymer sample is removed and submerged in a heating bath. Thereby foaming takes place. The period of submerging is 30 sec, but may also be shorter or longer in dependence from the polymer system. During submerging the sample is agitated continuously within the heating bath medium. Care should be taken so that the polymer sample is submerged completely within the heating medium. The heating medium is selected so that the polymer sample is not attacked chemically or physically during foaming. After foaming the polymer sample is chilled within an ethanol water mixture at about 20° C., preferably to a temperature below the glass transition temperature of the polymer, polymer blend or block copolymer.

Determination of the Critical Temperature of Polymer/Gas Mixtures

The critical temperature is defined as the foaming temperature above which no longer foamed polymer morphologies may be obtained, i. e. above which the density of the sample after foaming corresponds substantially to the density (>95 % of the starting value) of the used polymer sample. The critical temperature is above the glass transition temperature of the polymer/gas mixture.

Parts of the produced polymer films (polymers, polymer blends or block copolymers) are loaded with the gas or gas mixture within a pressure cell. The saturation temperature is 25° C.

The time for saturation has to be chosen so that a homogeneous profile of concentration is obtained. Relating to the time of adjusting the concentration profile reference is being made to the determination of the glass transition temperature above.

Several samples saturated at identical pressures with the blowing gas (for example carbon dioxide) are foamed at different temperatures. Thereby is shown that above a special critical temperature no foamed polymer morphologies may be obtained. It is shown thereby that polymer films after foaming become transparent again and the density of the foamed material becomes substantially the density of the starting material (density of the pure polymers, polymer blends or copolymers). The critical temperature optically found is confirmed by means of scanning electron microscopy (SEM). Samples which have been heated at a temperature above the critical temperature show a dense, non-cellular structure. Samples which have been heated at a temperature below the critical temperature show formation of cells (porosity).

Similarly, samples which have been heated at a temperature below the glass transition temperature of the polymer/gas mixture, show a dense structure. Samples which have been heated at a temperature above the glass transition temperature of the polymer/gas mixture show cells (porosity). The glass transition temperature of a polymer/gas mixture is defined here as average value between the temperature at which still no foaming is recognizable, and the temperature at which formation of cells is found by SEM.

The critical concentration depends among others from the foaming time as well as the concentration of the dissolved blowing gases. At shorter foaming times the critical temperature is increased. By increasing the concentration of the dissolved blowing gases the value of the critical temperature may be decreased. Thus, for each foaming time and concentration of dissolved blowing gas the critical temperature must be determined newly. This is especially true if another foaming method than disclosed here is used, since thereby the foaming times may be quite different from the stated value.

Determination of the Critical Gas Concentration

The critical gas concentration is defined as the lowest gas concentration (preferably saturation concentration) above which at a foaming temperature limited by the glass transition temperature as upper limit for a corresponding gas concentration (concentration of saturation) percolation by means of the methods disclosed under b) or c) for one or several foamed polymer samples can be found.

a) Pressure cell process

Parts of the prepared polymer films (polymers, polymer blends or block copolymers) are loaded with the gas or gas mixture within a pressure cell. The saturation temperature is 25° C. or lower. The time of saturation must be adjusted so that a homogeneous concentration profile is obtained. In the event of carbon dioxide as blowing gas and using amorphous polymer films having a thickness of about 100 µm a saturation time of about 2 h is sufficient.

After spontaneous removal of the blowing gases from the pressure cell the polymer sample is taken and submerged in a heating bath. Thereby the sample is foamed. The time of submerging is usually 30 sec, but may be longer or shorter. During submerging the sample is agitated within the heating bath. After foaming the sample is chilled within an ethanol water mixture (about 20° C.), preferably at a temperature below the glass transition temperature of the polymers, polymer blends or block copolymers. All samples foamed at temperatures above the glass transition temperature of this polymer/gas mixture as well as below the critical temperature of the said mixture are checked relating to the percolation.

b) Autoclave process

In this process the saturation with the gas or gas mixture above the glass transition temperature of the polymer/gas mixture and foaming are initiated by a spontaneous removal of the gas pressure. There from results that the foaming temperature is identical with the temperature of saturation. If polymer samples are saturated or foamed at increasing temperatures with the gas or gas mixture, there is shown that above a critical temperature no foamed polymer morphologies may be obtained. By variation of the conditions of saturation (gas pressure, temperature) different concentrations of saturation within the polymer or polymer blend may be adjusted. For such a changed condition of saturation (concentration of saturation) again a critical temperature may be found.

c) Extrusion process

In this method the formation of foam is obtained at the exit of the polymer/gas mixture from the extruder head. By variation of the temperature at the extruder head a temperature may be found above which no foamed polymer morphologies may be obtained. Similar as mentioned for the autoclave process by variation of the saturation conditions (pressure, gas pressure, temperature) different concentrations of saturation in the polymer or polymer blend may be adjusted. For these changed conditions of saturation (concentrations of saturation) again the critical temperature may be determined.

d) Solid-spinning process

In this process foaming is obtained at the exit of the saturated shaped articles from the jet head. This jet head enables the continuous transfer of a shaped article from a pressure cell without a pressure drop within the saturation chamber.

After the transfer of the saturated polymer sample into a heating bath foaming takes place. The time of submerging, chilling to a temperature below the glass transition temperature of the polymer, polymer blend or block copolymer corresponds to the conditions mentioned above for the determination of the critical temperature.

Several samples saturated at identical pressures with the blowing gas are foamed at increasing temperatures. All samples which have been foamed at temperatures above the glass transition temperature of the said polymer/gas mixture as well a below the critical temperature of this mixture are investigated relating to the percolation.

Thus, the foam diagram of a special polymer/gas mixture is determined as follows. First the sorption isotherm or isobar is determined to find out whether the expected critical concentration may be obtained. Then the pressure and the temperature are adjusted so to obtain a polymer concentration of 50 cm$^3$ (STP)/cm$^3$. Then the polymer is foamed at increasing temperatures and each foamed character is determined, for example by measurement of gas flux whereby the critical temperature for a special foaming time is determined.

As outlined above the polymer blends to be used according to the invention have to be homogeneous. Homogeneity of the polymer blends may be obtained in different manner. Below you will find two different methods to obtain homogeneity, but the invention is not restricted to the use of such methods.

The first example to obtain homogeneity is the method of solution blending. In this method the different polymers are dissolved in a common solvent and spread for example in the form of a thin film on a glass plate. After evaporation of the solvent a homogeneous film is obtained.

In the second example, the melt blending method, the polymers are continuously introduced into a blending apparatus which in turn is connected with an extruder. The blend at the exit of the extruder is homogeneous and may be immediately worked up.

In DE-A-10 033 401 there is disclosed how the critical gas concentration is determined within the pressure cell method, the autoclave method and the extrusion method.

In the solid spinning process, the foam is formed at the exit of the saturated shaped article from the die. This die enables the continuous transfer process of a shaped article from a pressure cell without pressure drop within the saturation chamber.

After transfer of the saturated polymer sample into a heating bath foaming occurs. The residence time is 30 s, but may be also shorter or longer in dependency from the polymer system and the drawing velocity. After foaming the article is chilled within an ethanol/water mixture of about 20° C., preferably a temperature below the glass transition temperature of the polymer blend/gas mixture or block copolymer/gas mixture.

Several samples which have been saturated with the foaming gas such as carbon dioxide are foamed at increasing temperatures. All samples which have been foamed at temperatures above the glass transition temperature of a mixture as well as below the critical temperature of this mixture are investigated relating to the permeation behaviour.

Preferably, at least one of the components of the polymer blend is amorphous or semicrystalline. The stabilization of the foam structure after foaming is provided by chilling, preferably in a mixture of ethanol and water.

As starting materials, preferably such polymers are selected for the polymer blend according to the invention, which have glass transition temperatures similar to each other, preferably not more diverse than 200° C., especially not more diverse than 150° C., and more preferably not more diverse than 100° C. The selection and combination of hydrophobic and hydrophilic polymers or the units and block length of the block copolymer are selected in such a manner that a polymer blend or block copolymer has a hydrophilicity, which allows (spontaneous) wetting of the membrane surface with blood, plasma or other aqueous solutions (Chi-Ming Chan, Polymer Surface Modification and Characterization, Hanser Publisher, Munchen 1994).

The following examples shall facilitate the understanding of the present invention and the advantages thereof, but not in any way restrict the scope of protection.

EXAMPLE 1

Foaming a Polymer Blend Consisting of Polyethersulfon and Polyvinylpyrrolidone 9 g of polyethersulfone (PES) (Ultrason® E 6020, BASF AG, Germany) and 1 g polyvinylpyrrolidone (PVP) (Kollidon® K90, BASF AG, Germany) were dissolved in 40 g 1-methyl-2-pyrrolidone (NMP) and the solution was spread as 0.5 mm thick films on glass plates. The films were dried under a nitrogen atmosphere at about 70° C. within a drying closet, subsequently the temperature of the drying closet was increased slowly to about 140° C. Subsequently, the films were dried within a vacuum drying closet until the concentration of solvent (NMP) was <0,02 wt. %. Portions of the obtained films (thickness ≦100 μm) were saturated with carbon dioxide at 55 bar and 0° C. within a pressure cell for 240 min. The films saturated with carbon dioxide were foamed at temperatures between 120 and 200° C. for 30 sec. It was shown that the samples foamed at a temperature of 150, 160, 170, 180 and 190° C., had penetrated open nanoporous structures.

| Foaming conditions: | |
| --- | --- |
| Saturation pressure: | 5.5 MPa |
| Saturation temperature: | 0° C. |
| Saturation gas: | carbon dioxide |
| Saturation time: | 4 h |
| Foaming temperature: | 160° C. |
| Foaming time: | 30 sec |

Interpretation of the scanning electron micrographs: Open nanoporous morphology having openings in the order of about 100 to 300 nm. The proof of the penetrating behaviour was made by means of the known through flow measuring (flux measurements).

| Foaming conditions: | |
| --- | --- |
| Saturation pressure: | 5.5 MPa |
| Saturation temperature: | 0° C. |
| Saturation gas: | carbon dioxide |
| Saturation time: | 4 h |
| Foaming temperature: | 180° C. |
| Foaming time: | 30 sec |

Interpretation of the scanning electron micrographs: Open nanoporous morphology having openings in the order of about 50 to 200 nm. The proof of the permeation behaviour was obtained by means of the known through flow measuring (flux measurements).

COMPARATIVE EXAMPLE 1

Foaming a Polymer Blend Consisting of Polyethersulfone and Polyvinylpyrrolidone 9 g of polyethersulfone (PES) (Ultrason® E 6020, BASF AG, Germany) and 1 g polyvinylpyrrolidone (PVP) (Kollidon® K90, BASF AG, Germany) were dissolved in 40 g 1-methyl-2-pyrrolidone (NMP) and the solution was spread as 0.5 mm thick films on glass plates. The films were dried under a nitrogen atmosphere at about 70° C. within a drying closet, subsequently the temperature of the drying closet was increased slowly to about 140° C. Subsequently, the films were dried within the vacuum drying closet until the concentration of solvent (NMP) was <0,02 wt. %. Portions of the obtained films (thickness ≦100 μm) were saturated with carbon dioxide at 50 bar and 25° C. within a pressure cell for 120 min. The films saturated with carbon dioxide were foamed at temperatures between 110 and 220° C. for 30 sec. It was shown that the foaming temperatures did not result In penetrating open nanoporous structures. The examination of the permeation behaviour has been made by means of the known through flow measuring (flux measurements).

| Foaming conditions: | |
| --- | --- |
| Saturation pressure: | 5.0 MPa |
| Saturation temperature: | 25° C. |
| Saturation gas: | carbon dioxide |
| Saturation time: | 2 h |
| Foaming temperature: | 160° C. |
| Foaming time: | 30 sec |

Interpretation of the scanning electron micrographs showed closed cell morphology with cells in the order of about 0.5 to 1 μm, since during saturation with 5 MPa $CO_2$ at 25° C. the critical concentration was not obtained.

| Foaming conditions: | |
| --- | --- |
| Saturation pressure: | 5.0 MPa |
| Saturation temperature: | 25° C. |
| Saturation gas: | carbon dioxide |
| Saturation time: | 2 h |
| Foaming temperature: | 180° C. |
| Foaming time: | 30 sec |

Interpretation of the scanning electron micrographs: Closed cell morphology with cells in the order of about 0.5 to 2 μm, since during saturation with 5 MPa $CO_2$ at 25° C. the critical concentration was not obtained.

EXAMPLE 2

Foaming a Polymer Blend Consisting of Polyethersulfone and Polyvinylpyrrolidone 8 g polyethersulfone (PES) (Ultrason® E 6020, BASF AG, Germany) and 2 g of polyvinylpyrrolidone (PVP) (Kollidon® K90, BASF AG, Germany) were dissolved in 40 g of 1-methyl-2-pyrrolidone (NMP) and the solution was spread as 0.5 mm thick films on glass plates. The films were dried in a drying closet (nitrogen atmosphere) at about 70° C., and the temperature of the drying closet was increased slowly to about 140° C. Finally, the films were dried in a vacuum drying closet until the solvent concentration (NMP) was <0.02 wt. %. The portions of the obtained films (thickness ≦100 μm) were saturated with carbon dioxide at 55 bar and 0° C. in a pressure cell during 240 min. Foaming of the films saturated with carbon dioxide was made at temperatures between 140 and 180° C. during 30 sec. It was shown that the samples foamed at a temperature of 150, 160, 170 and 180° C. resulted in penetrated nanoporous structures.

| Foaming conditions: | |
| --- | --- |
| Saturation pressure: | 5.5 MPa |
| Saturation temperature: | 0° C. |
| Saturation gas: | carbon dioxide |
| Saturation time: | 4 h |
| Foaming temperature: | 170° C. |
| Foaming time: | 30 sec |

Interpretation of the scanning electron micrographs: Open nanoporous penetrated morphology with openings in the order of about 20 to 200 nm. Proof of the penetration behaviour was made by means of the known through flow measurement (flux measurements).

EXAMPLE 3

Foaming a Polymer Blend Consisting of Polyethersulfone and Polyvinylpyrrolidone 8 g of polyethersulfone (PES) (Utrason®E 6060, BASF AG, Germany) and 2 g of polyvinylpyrrolidone (PVP) (Kollidon® K90, BASF AG, Germany) were dissolved in 40 g 1-methyl-2-pyrrolidone (NMP), and the solution was spread as 0.5 mm thick films on glass plates. The films were dried in a drying closet (nitrogen atmosphere) at about 70° C. and subsequently the temperature of the drying closet was increased slowly to about 140° C. Subsequent drying within the vacuum drying closet, occurred until the solvent concentration (NMP) was <0.02 wt. %. Portions of the obtained films (thickness ≦100 μm) were saturated at 8 bar and 25° C. with chlorodifluoromethane in a pressure cell during 168 h. Foaming of the films saturated with chlorodifluoromethane occurred at 150 and 170° C. during 30 sec. It was shown that both foamed samples had penetrated open nanoporous structures.

| Foaming conditions: | |
|---|---|
| Saturation pressure: | 0.8 MPa |
| Saturation temperature: | 25° C. |
| Saturation gas: | chlorodifluoromethane |
| Saturation time: | 168 h |
| Foaming temperature: | 150° C. |
| Foaming time: | 30 sec |

Interpretation of the scanning electron micrographs: Open nanoporous penetrated morphology having openings in the order of about 50 to 300 nm. Proof of penetration behaviour was made by means of the known through flow measuring (flux measurements).

| Foaming conditions: | |
|---|---|
| Saturation pressure: | 0.8 MPa |
| Saturation temperature: | 25° C. |
| Saturation gas: | chlorodifluoromethane |
| Saturation time: | 168 h |
| Foaming temperature: | 170° C. |
| Foaming time: | 30 sec |

Interpretation of the scanning electron micrographs: Open nanoporous penetrated morphology having openings in the order of about 20 to 200 nm. Proof of penetration behaviour was made by means of the known flux measurement.

EXAMPLE 4

Foaming a Polymer Blend Consisting of Polyethersulfone and Sulfonated Polyethersulfone 8 g of polyethersulfone (PES) (Ultrason® E 6020, BASF AG, Germany) and 2 g sulfonated polyethersulfone E 6020 (sPES) were dissolved in 40 g 1-methyl-2-pyrrolidone (NMP) and the solution was spread as 0.5 mm thick films on glass plates. The degree of sulfonation of the sPES was 0.33 mmol $SO_3$/gs polymer. The films were dried within a drying closet (nitrogen atmosphere) at about 70° C. and subsequently the drying closet temperature was increased slowly to about 140° C. Subsequently, the films were dried within a vacuum drying closet until the solvent concentration (NMP) was <0.02 wt. %. Portions of the obtained films (thickness ≦100 μm) were saturated at 55 bar and 0° C. with carbon dioxide within a pressure cell during 240 min. Foaming the films saturated with carbon dioxide occurred at temperatures between 90 and 210° C. during 30 sec. It was shown that the samples foamed at a temperature of 130, 140, 150, 160, 170, 180 and 190° C. had penetrated and open nanoporous structures.

| Foaming conditions: | |
|---|---|
| Saturation pressure: | 5.5 MPa |
| Saturation temperature: | 0° C. |
| Saturation gas: | carbon dioxide |
| Saturation time: | 4 h |
| Foaming temperature: | 160° C. |
| Foaming time: | 30 sec |

Interpretation of the scanning electron micrographs: Open nanoporous penetrated morphology with openings in the order of about 50 to 350 nm. Proof of the penetration behaviour was made by means of the known flux measurements.

| Foaming conditions: | |
|---|---|
| Saturation pressure: | 5.5 MPa |
| Saturation temperature: | 0° C. |
| Saturation gas: | carbon dioxide |
| Saturation time: | 4 h |
| Foaming temperature: | 170° C. |
| Foaming time: | 30 sec |

Interpretation of the scanning electron micrographs: Open nanoporous penetrated morphology with openings in the order of about 50 to 300 nm. Proof of the penetration behaviour was made by means of the known through flow measurement (flux measurements).

COMPARATIVE EXAMPLE 2

Foaming a Polymer Blend Consisting of Polyethersulfone and Sulfonated Polyethersulfone 8 g of polyethersulfone (PES) (Ultrason® E 6020, BASF AG, Germany) and 2 g of sulfonated polyethersulfone E 6020 (sPES) were dissolved in 40 g 1-methyl-2-pyrrolidone (NMP), and the solution was spread as 0.5 mm thick films on glass plates. The degree of sulfonation of the sPES was 0.33 mmol of $SO_3$/gs of polymer. The films were dried in a drying closet (nitrogen atmosphere) at about 70° C. and subsequently, the temperature of the drying closet was slowly increase to about 140° C. Subsequent drying within a vacuum drying closet was carried out until the solvent concentration (NMP) was <0.02 wt. %. Portions of the obtained films (thickness ≦100 μm) were saturated at 51 bar and 20° C. with carbon dioxide within a pressure cell during 240 min. The films saturated with carbon dioxide were foamed at temperatures between 90 and 240° C. during 30 sec. It was shown that at all adjusted foaming temperatures penetrated open nanoporous structures can not be obtained.

| Foaming conditions: | |
|---|---|
| Saturation pressure: | 5.1 MPa |
| Saturation temperature: | 20° C. |
| Saturation gas: | carbon dioxide |
| Saturation time: | 2 h |

-continued

| Foaming conditions: | |
|---|---|
| Foaming temperature: | 150° C. |
| Foaming time: | 30 sec |

Interpretation of the scanning electron micrographs: Closed cell morphology having cells in the order of about 0.5 to 1 μm, since by saturation with 5.1 MPa $CO_2$ at 20° C. the critical concentration is not obtained.

| Foaming conditions: | |
|---|---|
| Saturation pressure: | 5.1 MPa |
| Saturation temperature: | 20° C. |
| Saturation gas: | carbon dioxide |
| Saturation time: | 2 h |
| Foaming temperature: | 170° C. |
| Foaming time: | 30 sec |

Interpretation of the scanning electron micrographs: Closed cell morphology having cells in the order of about 0.5 to 1.5 μm, since by saturation with 5.1 MPa $CO_2$ at 20° C. the critical concentration is not obtained.

EXAMPLE 5

Foaming a Polymer Blend Consisting of Polyethersulfone and Sulfonated Polyethersulfone 8 g of polyethersulfone (PES) (Ultrason® E 6020, BASF AG, Germany) and 2 g of sulfonated polyethersulfone E 6020 (sPES) were dissolved in 40 g of 1-methyl-2-pyrrolidone (NMP), and the solution was spread as 0.5 mm thick films on glass plates. The degree of sulfonation of the sPES was 0.33 mmol $SO_3$/gs of polymer. The films were dried in a drying closet (nitrogen atmosphere) at about 70° C. and subsequently the temperature of the drying closet was slowly increased to about 140° C. Subsequently, the films were dried in a vacuum drying closet until the concentration of the solvent (NMP) was <0.02 wt. %. Portions of the obtained films (thickness ≦100 μm) were saturated at 8 bar and 25° C. with chlorodifluoromethane within a pressure cell during 168 h. The films saturated with chlorodifluoromethane were foamed at 170° C. during 30 sec. It was shown that the foamed samples had penetrated open nanoporous structure.

| Foaming conditions: | |
|---|---|
| Saturation pressure: | 0.8 MPa |
| Saturation temperature: | 25° C. |
| Saturation gas: | chlorodifluoromethan |
| Saturation time: | 168 h |
| Foaming temperature: | 170° C. |
| Foaming time: | 30 sec |

Interpretation of the scanning electron micrographs: Open nanoporous penetrated morphology having openings in the order of about 50 to 500 nm. Proof of the penetration behaviour was made by means of the known flux measurement.

EXAMPLE 6

Foaming a Polymer Blend Consisting of Polyethersulfone and Polyethyloxazoline 9 g of polyethersulfone (PES) (Ultrason®E6020, BASF Ag, Germany) and 1 g of poly(2-ethyl-2-oxazoline) (PEOX) (Aldrich Chemical Company, German) were dissolved in 40 g of 1-methyl-2-pyrrolidone (NMP) and the solution was spread in form of 0.5 mm thick films on glass plates. The molecular weight M, of the PEOX was about 500 000. The films were dried in the drying closet (nitrogen atmosphere) at about 70° C., and subsequently the temperature of the drying closet was slowly increased to about 140° C. Subsequently, the films were dried in a vacuum drying closet until the solvent concentration (NMP) was <0.02 wt. %. Portions of the obtained films (thickness ≦100 μm) were saturated at 56 bar and 0° C. with carbon dioxide in a pressure cell for 240 min. The films saturated with carbon dioxide were foamed at 150° C. during 1 and 2 sec. It was shown that both samples had open nanoporous structures.

| Foaming conditions: | |
|---|---|
| Saturation pressure: | 5.6 MPa |
| Saturation temperature: | 0° C. |
| Saturation gas: | carbon dioxide |
| Saturation time: | 4 h |
| Foaming temperature: | 160° C. |
| Foaming time: | 2 sec |

Interpretation of the scanning electron micrographs: Open nanoporous morphology having openings in the order of about 50 to 300 nm. Proof of the penetration behaviour was made by means of the known flux measurement.

COMPARATIVE EXAMPLE 3

Foaming a Polymer Blend Consisting of Polyethersulfone and Polyethyloxazoline 9 g of polyethersulfone (PES) (Ultrason® E 6020, BASF AG, Germany) and 1 g of poly(2-ethyl-2-oxazoline) (PEOX) (Aldrich Chemical Company, Germany) were dissolved in 40 g of 1-methyl-2-pyrrolidone (NMP), and the solution was spread as 0.5 mm thick films on glass plates. The molecular weight $M_w$ of the PEOX was about 500 000. The films were dried in the drying closet (nitrogen atmosphere) at about 70° C., and subsequently the temperature of the drying closet was slowly increased to about 140° C. Subsequently, the films were dried in the vacuum drying closet until the solvent concentration (NMP) was <0.02 wt. %. Portions of the obtained films (thickness ≦100 μm) were saturated at 56 bar and 0° C. with carbon dioxide within a pressure cell during 240 min. The films saturated with carbon dioxide were foamed at 150° C. for 30 sec. It was shown that foamed samples had no open nanoporous structures. The examination relating to the penetration behaviour is carried out by means of the known through flow measurement (flux measurements).

| Foaming conditions: | |
|---|---|
| Saturation pressure: | 5.6 MPa |
| Saturation temperature: | 0° C. |
| Saturation gas: | carbon dioxide |
| Saturation time: | 4 h |
| Foaming temperature: | 160° C. |
| Foaming time: | 30 sec |

Interpretation of the scanning electron micrographs: Closed cell morphology having cells in the order of about 100 to 500 nm, since during saturation with 5.6 PMa $CO_2$ at 0° C.

the critical concentration is reached, but the foaming time for this system with 30 sec is selected too high.

The invention claimed is:

1. A membrane having an open-nanoporous morphology producible by shaping a polymer blend by melt processing, loading the polymer blend with a foaming gas at a superatmospheric pressure, foaming the foaming gas loaded polymer blend at a gas concentration within the polymer blend above a critical gas concentration and at a temperature below a critical temperature, but above the glass transition temperature of the polymer blend/gas mixture and finally stabilizing into a foam structure, said polymer blend being a homogeneous hydrophilic polymer blend having a hydrophilicity that allows spontaneous wetting of the membrane surface with blood, plasma, or other aqueous solutions, comprising components including, at least one hydrophilic polymer and at least one hydrophobic polymer, wherein the polymer blend has a solubility relating to the used foaming gas above the critical gas concentration, and the glass transition temperature of the components of the polymer blend are within 150° C. of one another.

2. A membrane according to claim 1, wherein said membrane is foamed at a temperature at least 10° C. below the critical temperature.

3. A membrane according to claim 1 or 2, wherein said membrane is foamed above a critical gas concentration, said critical concentration being at least 40cm$^3$ (STP)/cm$^3$ of the polymer blend.

4. A membrane according to claim 1, wherein the polymer blend comprises an amorphous or semi-crystalline component.

5. A membrane according to claim 1, wherein the polymer blend after shaping is charged with the foaming gas at a temperature below the glass transition temperature of the polymer blend/gas mixture and is then foamed by increasing the temperature to above the glass transition temperature of the polymer blend/gas mixture, but below the critical temperature of the polymer blend/gas mixture.

6. A membrane according to claim 1, wherein after shaping at a temperature above the glass transition temperature of the polymer blend/gas mixture but below the critical temperature of the polymer blend/gas mixture, the mixture is charged with the foaming gas and foamed by a pressure decrease.

7. A membrane according to claim 1, wherein before shaping the polymer blend/gas mixture, said membrane is fed with the foaming gas into an extrusion tool by a pressure decrease, and is foamed within said extrusion tool or before exiting from said extrusion tool at a temperature above the glass transition temperature of the polymer blend/gas mixture but below the critical temperature.

8. A membrane according to claim 1, wherein said foaming gas is carbon dioxide.

9. A membrane according to claim 1, wherein the foam structure after foaming is stabilized by chilling.

10. A membrane according to claim 1, wherein said hydrophobic polymer is one of polysulfone, polyethersulfone, polyetherimide, polycarbonate, or any mixture thereof.

11. A membrane according to claim 1, wherein said hydrophilic polymer is one of polyvinylpyrrolidone, sulfonated polyethersulfone, and polyethyloxazoline, or at least one functionalized polysulfone, polyethersulfone, polyetherimide, or polycarbonate, or any mixtures thereof.

12. A membrane according to claim 1, wherein the components of the polymer blend have glass transition temperatures, said glass transition temperatures being similar.

13. A membrane according to claim 1, wherein said membrane is a flat membrane, a hollow fibre membrane, or a monofilament membrane.

14. A membrane according to claim 1 or 2, wherein the membrane is foamed at a critical gas concentration, said critical gas concentration being at least 43 cm$^3$ (STP)/cm$^3$ of the polymer blend.

15. A membrane according to claim 1 or 2, wherein the membrane is foamed at a critical gas concentration, said critical gas concentration being at least 45 cm$^3$ (STP)/cm$^3$ of the polymer blend.

16. A membrane according to claim 1 or 2, wherein the membrane is foamed at a critical gas concentration, said critical gas concentration being at least 47 cm$^3$ (STP)/cm$^3$ of the polymer blend.

17. A membrane according to claim 9, wherein said foam structure is chilled in an ethanol/water mixture.

18. A membrane according to claim 1, wherein the components of the polymer blend have glass transition temperatures, said glass transition temperatures being within 100° C. of one another.

* * * * *

UNITED STATES PATENT AND TRADEMARK OFFICE
CERTIFICATE OF CORRECTION

PATENT NO. : 7,644,825 B2  Page 1 of 1
APPLICATION NO. : 10/532131
DATED : January 12, 2010
INVENTOR(S) : Bernd Krause et al.

It is certified that error appears in the above-identified patent and that said Letters Patent is hereby corrected as shown below:

In Title page, item (30),

"Foreign Application Priority Data
Nov. 30, 2002    (EP) ............... 02026720"

should read

--Foreign Application Priority Data
Nov. 30, 2002    (EP) ............... 02026720.9--

Signed and Sealed this

Sixteenth Day of March, 2010

David J. Kappos
*Director of the United States Patent and Trademark Office*